Dec. 2, 1930. W. O. ISAACSON 1,783,792
COOKING UTENSIL
Filed Nov. 15, 1928
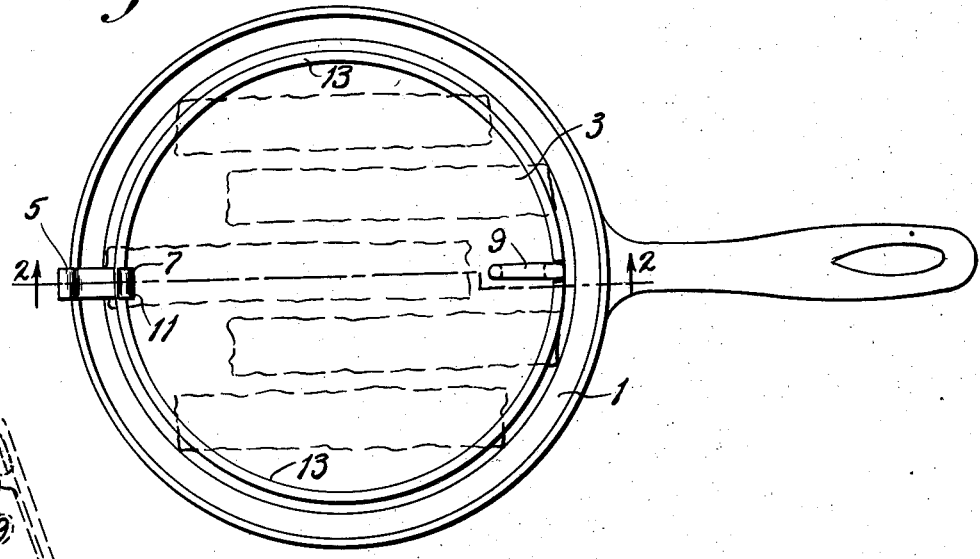
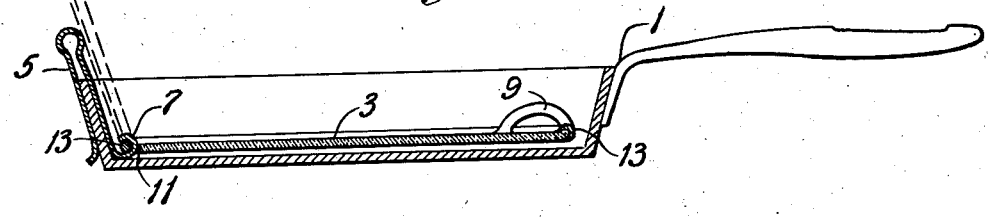
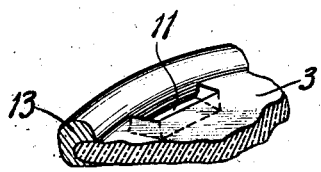

Patented Dec. 2, 1930

1,783,792

UNITED STATES PATENT OFFICE

WILLIAM O. ISAACSON, OF CHICAGO, ILLINOIS

COOKING UTENSIL

Application filed November 15, 1928. Serial No. 319,713.

This invention relates to cooking utensils, and with regard to more specific features, to frying pans adapted to cook bacon, ham, and the like.

Among the objects of the invention may be noted the provision of a frying pan for thin-sliced articles and the like, such as bacon, which will prevent curling of the frying meat; the provision of means of the class described which will prevent uneven frying of the meat, and the provision of means of the class described which are easily fitted into an ordinary frying pan or the like. Other objects will be in part obvious and in part pointed out hereinafter.

The invention accordingly comprises the elements and combinations of elements, features of construction, and arrangements of parts which will be exemplified in the structure hereinafter described, and the scope of the application of which will be indicated in the following claims.

In the accompanying drawings in which is illustrated one of various possible embodiments of the invention, Fig. 1 is a plan view of the invention;

Fig. 2 is a sectional view taken on line 2—2 of Fig. 1; and,

Fig. 3 is a perspective view of a part of the invention.

Similar reference characters indicate corresponding parts throughout the several views of the drawings.

In the process of frying thin-sliced meats, such as bacon and the like, it is desirable to prevent the bacon from curling, inasmuch as this curling results in uneven cooking, frying and/or baking of the bacon. The curled bacon touches the hot frying pan in a few places only; these places become overcrisp while the rest of the bacon remains relatively uncooked. It is ordinarily impossible to keep bacon and like meats from doing this in an open frying pan.

The present invention overcomes the above difficulty and provides a method of solving it.

In Fig. 1, the numeral 1 represents an ordinary frying pan, skillet, or spider. A lid-shaped portion 3 is held therein by means of a one-piece spring clamp 5 and bearing 7.

The bearing 7 holds the lid shaped portion 3 in such a position that there is a small space between it and the interior bottom of the frying pan 1.

The lid portion 3 is provided with a handle 9 to lift said lid portion (by means of a hook or other implement, if necessary) for removal of the cooked bacon or other substance.

The clamp portion 5 is made to securely grip the side of the frying pan and hingedly hold the lid portion by means of the hole 11 therein.

The lid portion is preferably made of relatively heavy and solid, heat-resisting glass, such as Pyrex glass, so that the progress of the cooking may be watched. Other materials such as metals may be used. Screening or perforated metal sheets may also be used, but the difficulty of cleaning the apparatus is thereby increased. It is to be understood that the lid or weight, when made of Pyrex glass or the like may comprise an open structure or grid. The lid portion 3 is preferably enclosed or bound by a rim 13 formed of some heavy material. This rim serves to strengthen the lid portion and simultaneously add weight to it. The bearing or hinge portion 7 reacts against this rim 13 in the present embodiment and reduces the strain upon the glass.

The invention may either be made detachable, as is shown in the drawings, and heretofore illustrated in the specification, or formed with the spider as a permanent portion thereof. In the event that it is made a permanent part of the pan, the clamp or hinge portion 5 is dispensed with, and a permanent bearing is formed in the side of the spider.

In use, the invention is manipulated in the following manner: The lid portion 3 is first raised to the dotted line position. The bacon or other meat is now laid on the bottom of the skillet, and the lid portion 3 is returned to its original position, clamping the bacon flatly into the pan. The heat is now applied and the bacon proceeds to cook, the weight of the lid portion substantially preventing curling and insuring an even baking or frying.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. The cooking utensil which comprises a frying pan and means therein for holding substances flat against the bottom thereof, said means comprising a hinged glass plate.

2. The attachment for frying pans which comprises a lid portion, and a clamp hinged thereto, said clamp being adapted to hold said lid portion close to the interior bottom of a frying pan.

3. The attachment for frying pans which comprises a lid portion, a handle thereon, and a clamp hinged thereto, said clamp being adapted to hold said lid portion close to the interior bottom of a frying pan.

4. The attachment for frying pans which comprises a heat-resisting glass lid portion, and a clamp hinged thereto, said clamp being adapted to hold said lid portion close to the interior bottom of a frying pan.

5. The attachment for frying pans which comprises a heat-resisting glass lid portion, a handle thereon, and a clamp hinged thereto, said clamp being adapted to hold said lid portion close to the interior bottom of a frying pan.

6. Means for evenly cooking sliced articles which comprise a heat-resisting glass plate, a handle thereon, and a clamp hinged thereto, said means being adapted to fit a frying pan.

In testimony whereof, I have signed my name to this specification this 10th day of November, 1928.

W. O. ISAACSON.